Figure 7:
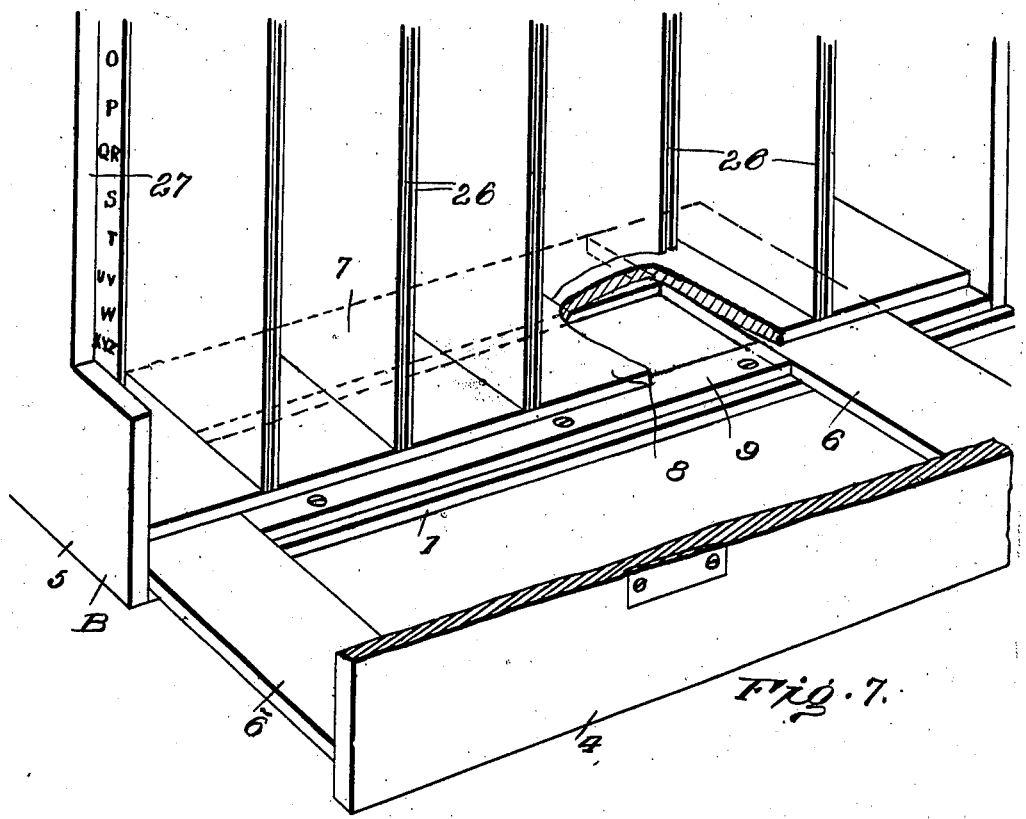

W. B. HARGRAVE.
FILING AND INDEXING APPLIANCE.
APPLICATION FILED AUG. 11, 1910.
999,991.
Patented Aug. 8, 1911.
4 SHEETS—SHEET 1.
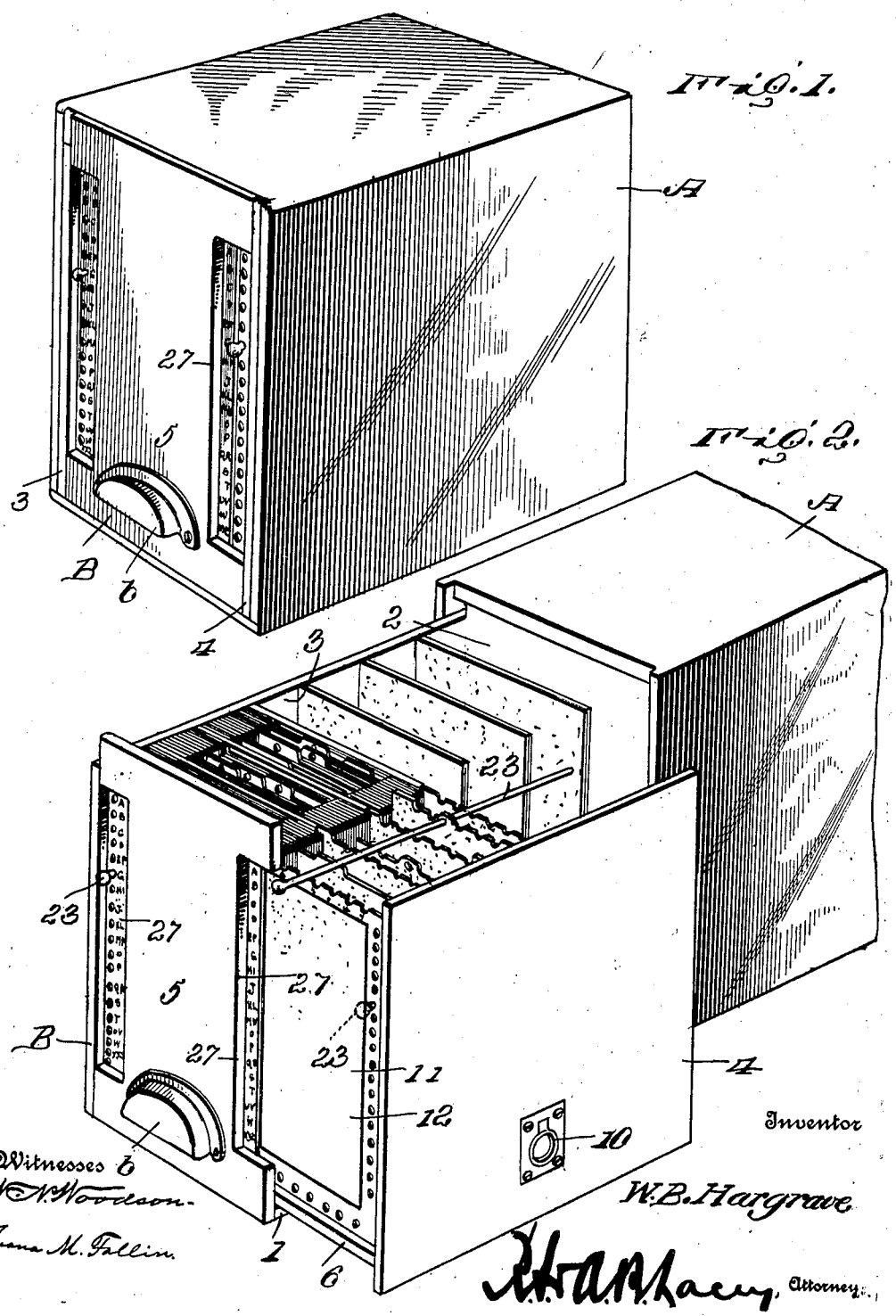
Witnesses
W. N. Woodson
Juana M. Fallin
Inventor
W. B. Hargrave
R. H. A. P. Lacey, Attorney

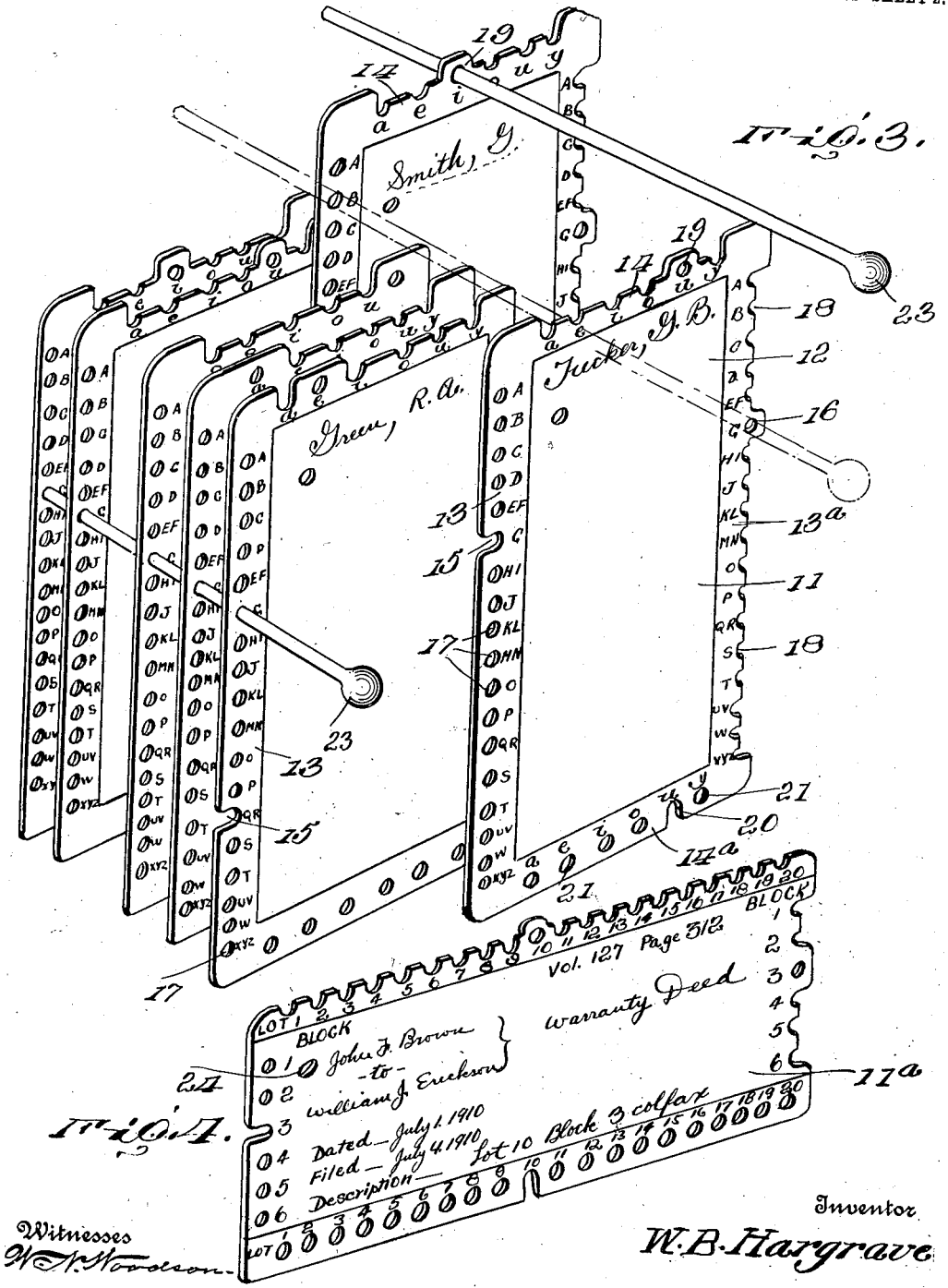

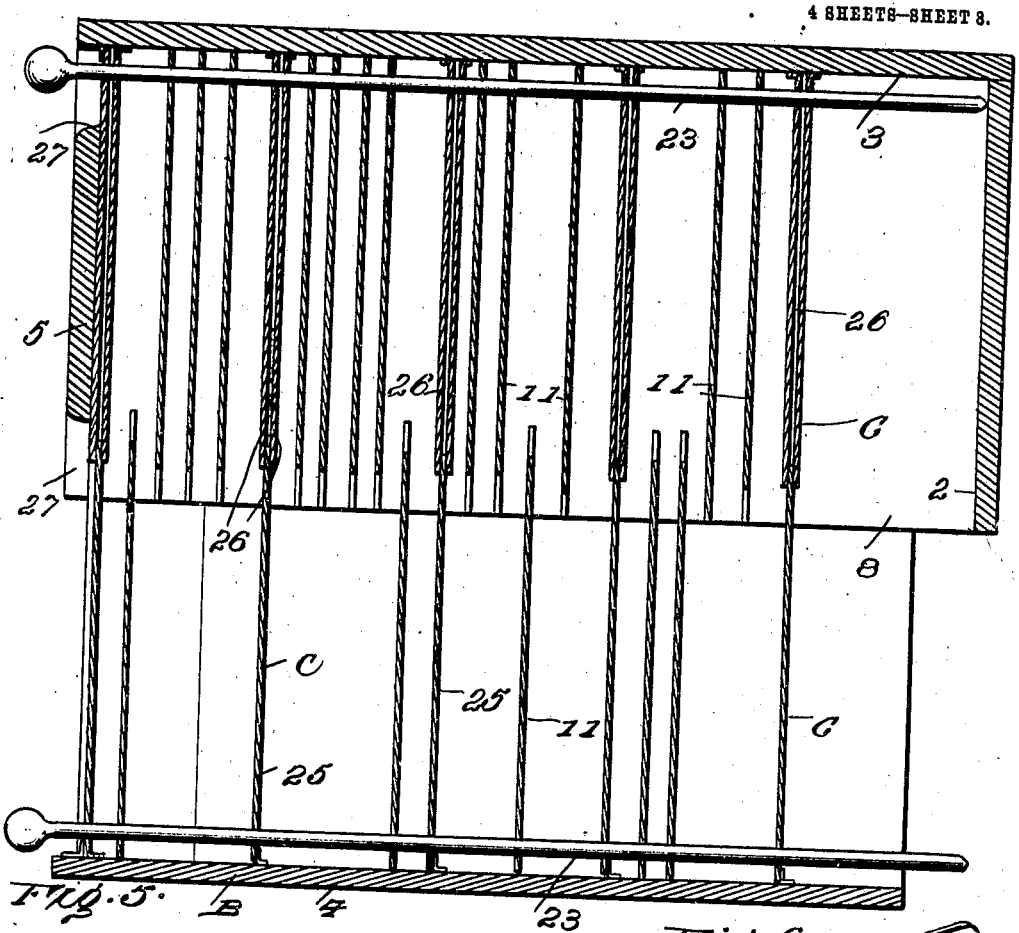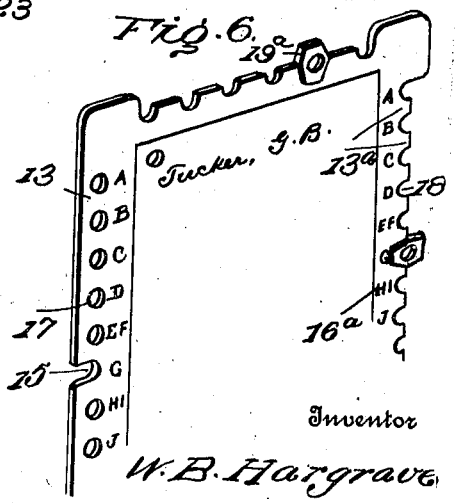

W. B. HARGRAVE.
FILING AND INDEXING APPLIANCE.
APPLICATION FILED AUG. 11, 1910.

999,991.

Patented Aug. 8, 1911.
4 SHEETS—SHEET 4.

UNITED STATES PATENT OFFICE.

WILLIAM B. HARGRAVE, OF COLFAX, WASHINGTON.

FILING AND INDEXING APPLIANCE.

999,991.  Specification of Letters Patent.  Patented Aug. 8, 1911.

Application filed August 11, 1910. Serial No. 576,719.

*To all whom it may concern:*

Be it known that I, WILLIAM B. HARGRAVE, citizen of the United States, residing at Colfax, in the county of Whitman and State of Washington, have invented certain new and useful Improvements in Filing and Indexing Appliances, of which the following is a specification.

This invention comprehends certain new and useful improvements in filing and indexing systems and appliances and the invention has for its primary object an improved card index system and apparatus which will be semi-automatic and efficient in its operation and which will insure as far as is possible with a mechanical device, against mistake.

The invention also has for its object an apparatus of this character which will reduce to a minimum selective operations on the part of the one using the device, which will enable the operator to very quickly find and extract any desired card, and which will be so arranged that the card desired may be found with equal facility and expedition no matter where it may have been put in the filing case or cabinet.

The invention has for a further object an improved device of this type, the cards of which are so arranged and constructed that they will immediately indicate to the operator when any card or cards have been inserted in the case or cabinet up-side-down or rear face foremost.

Another object of the invention is to provide means whereby, when a plurality of filing cases or cabinets are employed, a check may be had on all of the cards that should be placed in any one cabinet, whereby the operator may at once tell when any cabinet contains a card which does not belong to it.

The invention also has for its object, in a system of this character, an improved construction of filing case or cabinet for the cards which will also tend to render easy and quick the operation of removing any cards that may be desired. And for a still further object, the invention aims to produce an improved filing or indexing system or appliance which will render devices of this character more commercially desirable and effective in use.

With these and other objects in view, the invention consists in certain constructions, arrangements and combinations of parts that I shall hereinafter fully describe and claim.

Figure 8:
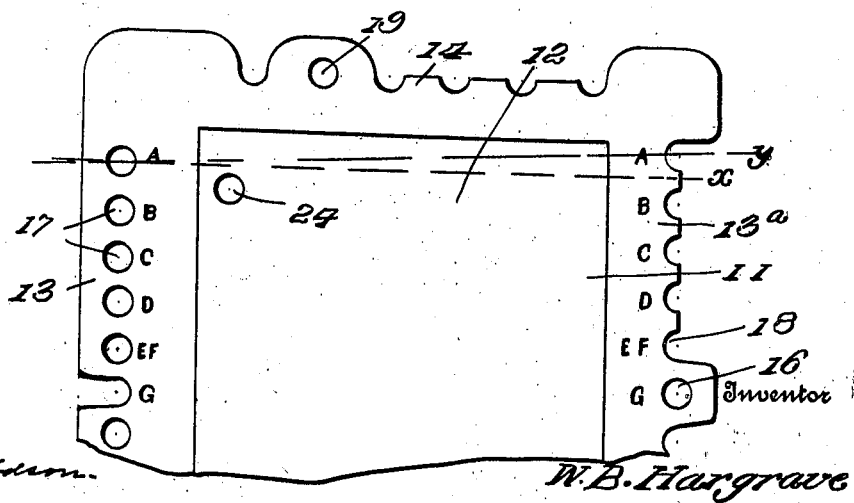

For a full understanding of the invention, reference is to be had to the following description and accompanying drawings, in which:

Figure 1 is a perspective view of one form of case or cabinet which may be employed in my invention; Fig. 2 is a similar view of the cabinet, the drawer thereof being shown in its drawn out position and with one side extended, just preparatory to selecting and extracting a card or cards; Fig. 3 is a perspective view of one embodiment and arrangement of cards that may be employed, the same being shown slightly separated from each other; Fig. 4 is a detail perspective view of one card, illustrating one of the many modifications in the form and arrangement of the cards that may be made within the purview of my invention; Fig. 5 is an enlarged horizontal sectional view through the drawer of the cabinet; Fig. 6 is a fragmentary perspective view of one of the cards, illustrating a slight modification in the extracting parts thereof; Fig. 7 is an enlarged fragmentary perspective view of the drawer of the cabinet, illustrating particularly the extensible side thereof and its connection with the other parts of the drawer; and, Fig. 8 is a face view of a portion of one of the cards designed particularly to illustrate the non-alinement of the apertures and corresponding recesses or nicks in the opposite side margins of the card, this being a preferred arrangement for a purpose which will be presently specifically described.

Corresponding and like parts are referred to in the following description and indicated in all the views of the drawings by the same reference characters.

My improved filing and indexing card system or apparatus may embody a cabinet A of any desired construction, and of any desired size or shape according to the size and shape and number of cards that are to be used with it, and said cabinet includes, in addition to its inclosing case or body portion, a drawer B. This drawer is designed, preferably, to snugly fit within the main body portion of the cabinet A when the device is not in use and it may be provided with any of the ordinary forms of drawer pulls b by which it may be easily drawn out and slid back into place. The drawer B comprises a main bottom 1, a rear vertically disposed plate or board 2, constituting the back, a relatively stationary side 3, and a relatively movable opposite side 4, the side 4 being laterally extensible relative to the bottom 1, back 2, side 3, and front 5. The extensible side 4 is, naturally, arranged at the right-hand end of the drawer as viewed from the front, although it is to be understood that this arrangement is merely arbitrary although the preferred one. Said side is, as best illustrated in Fig. 7, secured to a bottom frame which includes front and rear cross bars 6 and a connecting side bar 7, the cross bars being laterally movable between the main bottom 1 and a false bottom 8 with which the drawer is provided, and the movement of extension being limited by the abutment of the cross bar 7 with a cleat or stop 9 secured to the upper face of the main bottom 1, near one edge thereof. In order to assist in moving the extensible side 4 laterally, the same is provided with a preferably countersunk hinged pull 10.

Referring now particularly to Fig. 3 for an illustration of one form and arrangement of cards which may be included in my present invention, it will be seen that said cards, designated 11, are all of the same size and are vertically elongated, although it is to be understood that the invention is not limited to cards of any particular size or shape. Each of the cards 11 embodies a main panel 12 upon which may be written or printed the names or subject matter to be indexed.

It is to be understood that my invention is not limited to any particular construction of card face, as the same may be provided with any desired form of pocket or folder, or be flat as in the present instance; nor is my invention limited to any particular method of indexing, as it is applicable for use generally with any method of indexing that may be preferred and which will be evident to those skilled in the art to which this invention appertains. Merely as an example of one method, it will be noted, as will be hereinafter more fully described, that in the present instance the cards 11 are indexed as to names and with two selective steps, the first being that letter of the alphabet which commences the first given name of a party whose name is indexed, and the second step being the first vowel occurring after the initial letter of said party's surname. In addition to the names, the panels 12 of the respective cards may contain any desired data. In addition to the panel 12, each card 11 is provided on one face, namely, the front face, with side margins 13, 13ᵃ, and top and bottom horizontally extending margins 14, 14ᵃ. Each of these vertically extending side margins 13, 13ᵃ, displays a vertical column of designating characters which in the present instance are shown as the letters of the alphabet arranged in their order of sequence and with any desired letters grouped or paired, as the judgment of the indexer will dictate. The indexing characters of one side margin preferably correspond substantially, but not exactly in position to the similar characters on the other side margin, the non-alinement of the corresponding characters being purposely made to secure a result that I shall hereinafter particularly point out, in connection with a specific reference to Fig. 8. Furthermore, each side margin 13, 13ᵃ, is formed with a series of openings, such openings being arranged in transverse alinement with the adjacent designating characters or letters. On the left-hand margin 13 of each card, one of these openings is in the form of a slot opening at the edge of the card, and directly opposite said slot, in the right-hand margin 13ᵃ, a tab perforation 16 is formed.

While it is here stated, or indicated, that the slot 15 and perforation 16 are directly opposite each other, it is to be understood, as above pointed out, that they are not exactly in horizontal alinement, and as a matter of fact it is not necessary that they be at all in alinement, but merely that each slot or hole at one side of the card shall have a corresponding tab or perforation on the opposite end of the card, designated by a corresponding letter or numeral or word or words, without reference to their relative position. The other openings of the left-hand margin 13 are in the form of perforations or apertures 17 lying entirely within the marginal edge of the cards and in vertical alinement with the inner portion of the slot 15. The other openings of the right-hand margin 13ᵃ are in the form of substantially semi-circular recesses or nicks 18 which are all in vertical alinement with the innermost wall or half of the perforation 16. The top and bottom horizontally extended margins 14 and 14ᵃ are also formed with openings. Those in the upper margin 14 include a tab perforation 19 and those in the lower margin include a bottom edge-opening slot 20 in direct vertical alinement, preferably, with the tab perforation 19. The other openings of the bottom margins are in the form of perforations or apertures 21 lying entirely within the marginal edge of the cards, and the other openings of the top margin 14 are in the form of edge recesses or nicks 22. The perforations 21 are in horizontal alinement with the inner portion of the slot 20, and the nicks 22 are in horizontal alinement with the inner wall or half of the tab perforation 19. In the present embodiment of the invention now being described, designating characters are displayed on the front face of the card in juxtaposition to the respective openings of the top and bottom margin.

Deeming that an example of the operation of the cards in practical use will at this point tend to make clear the reasons for forming the cards as hereinbefore described and illustrated in the accompanying drawings, particularly in Fig. 3, let it be assumed that it is desired to extract from the cabinet the card which bears the name "G. Smith." In the operation of the device, I may use rods, bars, or similar devices, as indicated at 23, two of these being shown as employed in the present instance. In order, then, to extract the card containing the name above quoted, the operator will insert into the set of cards in the cabinet, the two rods 23, the same being moved into the "G" opening. This will hold within the drawer of the cabinet all of the cards except those whose slots 15 are located opposite the designating character G on the left-hand margin 13 of the cards and will insure that a sidewise pull on the extensible side 4 of the drawer and the right-hand pin or rod 23 which it carries, will draw to one side and segregate from the remaining cards, all the cards whose tab perforations 16 are located at the designating character G on the right-hand margins 13ª. Up to this point, under the particular method of indexing herein illustrated, we will have separated from the pack all of the cards containing the names of parties whose first given name begins with the letter G. To then secure the card belonging to the party whose name has been above quoted, the right-hand rod 23 is withdrawn from the position illustrated in dotted lines in Fig. 3 and is inserted across the upper margins of the separated cards, and in the "i" openings, whereupon it will be found that said rod will be inserted through the upper tab perforation 19 of the card which contains the name "G. Smith." The card can then be easily withdrawn by raising the pin or rod 23. Obviously, the same result will be secured with any of the cards, and with equal facility, no matter how the cards may be returned and placed in the box or cabinet, after having once been withdrawn therefrom.

I do not regard the openings in the bottom margins 14ª as essential to the completely successful operation of my invention, as gravity alone may be depended upon to prevent the raising of the laterally moved cards, except the one or ones engaged at the top by the lifting rod 23. However, these bottom openings may be found preferable and useful, particularly in cases where the cards are packed together tightly and pressed one against the other, in which event, after several cards, or one card as the case may be, has been moved to the right, the left-hand rod or pin 23 may be withdrawn from the position illustrated in Fig. 3 and inserted through the bottom margins of the separated cards or card and in through the proper vowel-designated opening, whereupon said rod will prevent the raising of any of the segregated cards except that whose tab perforation has inserted in it the lifting pin and whose slot has inserted through it the other pin or rod 23 at the bottom.

It is to be understood that my invention is not limited to any way of forming the slots 15, perforations 16, or other openings in the cards, and that said openings may be of any desired shape or formation, just so long as the perforation, such as 16 or 19, is capable of engagement by a rod or the like to move the card laterally or upwardly, and just so long as the corresponding slots 15 and 20 admit of the passing therethrough and out, of the complemental rod or similar extracting element. In other words, wherever the word perforation is used, for instance in the appended claims, it is to be understood that this term is not limited to a round hole lying entirely within the margin of the card, as illustrated in the drawings, but is also to include within its purview, any form of opening that is capable of being engaged by an extracting element inserted therein to move the card in the desired direction. The slots 15 may be produced by a punch of any desired character and the bottom slots 20 similarly formed. Or again, the perforations 16 and 19 may be formed in integral portions of the cards, or by means of tabs, the latter construction being indicated at 16ª and 19ª in Fig. 6.

At the end of the third preceding paragraph, I have stated that it does not matter how the cards are returned to the cabinet after they have once been extracted therefrom. This refers to the location of the card within the cabinet or drawer, and not to the particular position of the card in that location, as it is one of the objects of my invention, as stated at the outset of the specification, to provide means whereby it may be instantly ascertained, should any card be placed in the cabinet upside-down or rear-face foremost. I accomplish this last-named result by forming the series of openings in one side margin of the cards, slightly out of horizontal alinement with the corresponding openings in the other margin, this being graphically indicated in Fig. 8 by the lines $x$ and $y$, the line $x$ extending horizontally. Thus it will be evident that when a card is turned around and placed in the drawer or placed therein upside-down, solid portions of said card will obstruct the openings of the other cards and prevent the insertion of the pins or rods 23, thereby at once rendering it apparent to the operator that one or more cards are in the cabinet in a wrong position. It is also desirable when more than one cabinet is employed, to keep separate the cards of one cabinet from those of the other or others, and to this end I have formed at any desired, but corresponding point in all the cards which belong to any one cabinet, what I term master openings 24. These openings 24 in the cards of one cabinet will be at a different point in the cards from the corresponding openings in the cards of another cabinet; and hence, should a card of one cabinet be placed in a cabinet in which it does not belong, this fact can be easily ascertained and the card quickly located, should it be found missing from its proper place, by merely inserting one of the rods 23 through the master openings 24.

I have hereinbefore stated that my invention is not limited to indexing by names or in fact to any method of indexing, and to illustrate one of the various modifications in this regard which may be employed within the purview of my invention, reference is to be had to Fig. 4, wherein a card, designated 11ª, has its marginal openings contiguous to reference numerals. A card of this character may be found very useful in preparing abstract of titles to real estate. For example the particular card illustrated in Fig. 4, contains data which relate to block 3, lot 10, of some subdivision of a city or town real estate. Other modifications will readily suggest themselves, in the form and arrangement of the cards, to those versed in the art or methods of indexing.

In order to facilitate the operation of the device, I prefer to divide the drawer B into a series of preferably coextensive compartments, this being done in the present instance by extensible partitions C. Each of these partitions embodies a section 25 secured to the extensible side 4 of the drawer, and relatively stationary sections 26 arranged in slightly spaced pairs and secured to the relatively stationary side 3 of the drawer, the sections 26 receiving between them the sections 25. All of these sections are perforated so as to interfere in no wise with the insertion of the pins or rods 23. And if desired, they may display (particularly the sliding sections 25) the same designating characters as are displayed on the indexing cards. These extensible partitions not only serve to indicate to the operator what will be a proper positioning of the cards within the drawer to avoid the unnecessary crowding of the cards at any one point, while at the same time preventing the cards from sagging down without the use of any follower block which would tend to compress the cards too tightly, but the laterally movable sections 25, as they move with the extensible side 4 of the drawer and the pin or rod 23 inserted through said sections and some of the cards, tend to prevent any bending or skewing of the right-hand pin or rod such as would tend to break or bend the same, or render difficult the lateral movement of the segregated cards as the extensible sides 4 of the drawer is moved laterally, or result, in view of such bending or skewing, in some of the segregated cards being out of alinement and hence not lifted when the right hand pin is removed from its first position and inserted across the upper edges of the segregated cards.

As best illustrated in Fig. 2, the front 5 of the drawer B is formed at opposite sides with two vertical slots 27, displaying portions of the next partition section 26 behind said front. This section 26 constitutes a finder, and for such purpose is provided with designating characters, as illustrated in Fig. 2, corresponding in location and kind, to the vertical columns of indicating characters on the index cards. In addition, the left-hand portion of said section 26 is formed with openings to admit of the insertion of the left-hand pin or rod 23.

From the foregoing description in connection with the accompanying drawings, the operation of my improved filing and indexing device will be apparent, as I have described the operation in detail in connection with the description of the detail construction and arrangement of the parts. It may be stated, however, generally, that in the practical use of the invention as herein illustrated in the accompanying drawings, to find any card, the pins or rods 23 are inserted in through the proper openings in the vertical margins of the cards, either while the drawer is in the body portion of the cabinet or after it has been withdrawn therefrom, but while the drawer is in contracted condition. The drawer is then extended laterally, and the right hand pin is then removed from its first position and thrust across the upper edges of the segregated cards at the desired point and finally lifted to raise the card required. It is obvious that the nicking of the right hand marginal edges of all the cards and the upper edges of the cards, possesses an important function, as the nicks assist in guiding the pin or rod which is used at the right-hand side and top edge of the cards.

It is to be understood that various changes and modifications may be made in the constructions, arrangements and proportions of the parts without departing from the scope of my invention as defined in the appended claims.

Having thus described the invention, what is claimed as new is:

1. An apparatus of the character described, including a plurality of cards, formed with two sets of oppositely disposed marginal openings, the openings of one set including an edge opening slot, and the openings of the other set including a perforation.

2. An apparatus of the character described, including a plurality of cards, formed in their opposite side margins with openings, the openings of one margin including an edge opening slot and the openings of the other margin including a perforation substantially in alinement with said slot.

3. An apparatus of the character described, including a plurality of cards, formed at opposite side margins with a plurality of openings, the openings of one set including a slot and the openings of the other set including a perforation, and designating characters displayed on the cards in juxtaposition to the respective openings.

4. An apparatus of the character described, including a plurality of cards, formed in their opposite side margins with openings, the openings of one set including an edge opening slot and the openings of the other set including a perforation, each card being further formed with a top margin having a perforation formed therein.

5. An apparatus of the character described, including a plurality of cards, formed in their opposite side margins with openings, the openings of one set including an edge opening slot and the openings of the other set including a perforation, each card being further formed with a top margin having a perforation formed therein, and with a bottom margin having an edge opening slot formed therein.

6. An apparatus of the character described, including a plurality of cards, formed in their opposite side margins with openings, the openings of one set including an edge opening slot and the openings of the other set including a perforation, each card being further formed with a top margin having a perforation formed therein, and with a bottom margin having an edge opening slot formed therein, the last named slot being arranged in alinement with the last named perforation.

7. An apparatus of the character described, including a plurality of cards, formed with top, bottom and two side margins, each card being formed in its side margins with a plurality of openings, one set of openings including an edge opening slot and the other set of openings including a perforation, designating characters arranged in juxtaposition to the respective openings, other designating characters being displayed on the top margin and said top margin being formed with a perforation.

8. An apparatus of the character described, including a plurality of cards formed with top, bottom and two side margins, each card being formed in its side margins with a plurality of openings, one set of openings including an edge opening slot and the other set of openings including a perforation, designating characters arranged in juxtaposition to the respective openings, designating characters displayed on the top margin, corresponding designating characters displayed on the bottom margin, the top margin being formed with a perforation in juxtaposition to one of said designating characters on said margin, and the bottom margin being formed with an edge opening slot in juxtaposition to one of said designating characters of said bottom margin.

9. An apparatus of the character described, including a plurality of cards, formed in their side margins with a plurality of openings, the openings of one set including an edge opening slot, and a plurality of perforations, the openings of the other set including a perforation and a plurality of nicks.

10. An apparatus of the character described, comprising a plurality of cards, formed in one side margin with a plurality of openings including an edge opening slot, each card being formed in its opposite side margin with a perforation, the openings of the respective cards being arranged to register when the cards are grouped together, and extracting devices arranged to be inserted through corresponding openings, for the purpose specified.

11. An apparatus of the character described, comprising a plurality of cards, formed in one side margin with a plurality of openings including an edge opening slot, each card being formed in its opposite side margin with a perforation, the openings of the respective cards being arranged to register when the cards are grouped together, and rods adapted to be inserted through corresponding openings, for the purpose specified.

12. An apparatus of the character described, including a case, a plurality of cards contained within the case, the cards being formed at one side with an edge opening slot and at the opposite side with a perforation, each of the cards being formed with a master opening and the master opening of one card being designed to register with the master openings of all the other cards.

13. An apparatus of the character described, including a plurality of cards, a case designed to contain said cards, the cards being formed with registering openings, and means inserted through said openings for moving sundry of said cards to one side, but at the same time holding the remaining cards stationary.

14. An apparatus of the character described, including a laterally extensible drawer, a plurality of cards designed to be contained within the drawer, and means adapted to be inserted through the cards for holding sundry of said cards stationary and for moving the others to one side upon the extending of the drawer.

15. An apparatus of the character described, including a drawer formed with a laterally movable side, cards mounted within the drawer, and means arranged to be carried by the extensible side for engaging sundry of said cards, whereby said cards will be moved to one side upon the lateral movement of the side of the drawer, and means for holding the remaining cards stationary.

16. An apparatus of the character described, including a drawer formed with a laterally movable side, cards mounted within the drawer, means arranged to be carried by the extensible side for engaging sundry of said cards, whereby said cards will be moved to one side upon the lateral movement of the side of the drawer, and means for holding the remaining cards stationary, the means carried by the laterally movable side of the drawer for moving the cards from one side being detachable from the drawer whereby to permit the laterally moved cards to be extracted.

17. An apparatus of the character described, including a plurality of cards formed in opposite side margins with a plurality of openings, the openings of one set including an edge opening slot, and the openings of the other set including a perforation, the openings of one set being slightly out of horizontal alinement with the openings of the other set.

18. An apparatus of the character described, including a plurality of cards formed with registering openings, and means insertible through said openings for moving sundry of said cards away from the others, but at the same time holding the remaining cards stationary.

19. An apparatus of the character described, including a drawer formed with a laterally movable side, cards mounted within the drawer, means arranged to be carried by the extensible side for engaging sundry of said cards, whereby said cards will be moved to one side upon the lateral movement of the side of the drawer, means for holding the remaining cards stationary, and laterally extensible partitions within the drawer.

In testimony whereof, I affix my signature in presence of two witnesses.

WILLIAM B. HARGRAVE. [L. S.]

Witnesses:
W. N. WOODSON,
FREDERICK S. STITT.